(12) United States Patent
Miller et al.

(10) Patent No.: US 11,533,846 B2
(45) Date of Patent: Dec. 27, 2022

(54) HEADER POSITION CONTROL WITH DYNAMICALLY ADAPTED SENSITIVITY

(71) Applicant: Deere & Company, Moline, IL (US)

(72) Inventors: Byron K. Miller, Waterloo, IA (US); Benjamin M. Lovett, Colona, IL (US); Austin M. Laugen, Davenport, IA (US)

(73) Assignee: Deere & Company, Moline, IL (US)

( * ) Notice: Subject to any disclaimer, the term of this patent is extended or adjusted under 35 U.S.C. 154(b) by 351 days.

(21) Appl. No.: 16/128,859

(22) Filed: Sep. 12, 2018

(65) Prior Publication Data
US 2020/0077584 A1    Mar. 12, 2020

(51) Int. Cl.
*A01D 41/00*    (2006.01)
*A01D 41/14*    (2006.01)

(52) U.S. Cl.
CPC ......... *A01D 41/141* (2013.01); *A01D 41/145* (2013.01)

(58) Field of Classification Search
CPC .......................... A01D 41/141; A01D 41/145
USPC .......................................................... 701/50
See application file for complete search history.

(56) References Cited

U.S. PATENT DOCUMENTS

| 4,136,508 | A | * | 1/1979 | Coleman | ............... | A01D 41/141 |
|---|---|---|---|---|---|---|
| | | | | | | 56/208 |
| 4,437,295 | A | | 3/1984 | Rock | | |
| 5,359,836 | A | | 11/1994 | Zeuner et al. | | |
| 6,601,372 | B1 | | 8/2003 | Heinsey et al. | | |

FOREIGN PATENT DOCUMENTS

| CN | 108012655 A | 5/2018 |
|---|---|---|
| EP | 0198544 A1 | 10/1986 |
| EP | 2474220 A1 | 7/2012 |
| EP | 2832206 A1 | 2/2015 |
| WO | 2009136269 A1 | 11/2009 |

OTHER PUBLICATIONS

European Search Repod issued in counterpart European Patent Application No. 19192791.2 dated Feb. 10, 2020 (6 pages).

* cited by examiner

*Primary Examiner* — Tyler J Lee
*Assistant Examiner* — Tiffany P Ohman
(74) *Attorney, Agent, or Firm* — Joseph R. Kelly; Kelly, Holt & Christenson, PLLC

(57) ABSTRACT

The height of a header of a self-propelled harvesting machine is controlled by a closed loop header position control system. A sensitivity control system receives parameters related to header position error (e.g., an accuracy parameter) and machine stability (e.g., a stability parameter) and automatically identifies a sensitivity metric indicative of a sensitivity with which the header position control system controls the header height, based upon the received parameters. The sensitivity metric is provided to the header position control system. The header position control system performs closed loop header position control with a sensitivity level based upon the sensitivity metric provided by the sensitivity control system.

20 Claims, 5 Drawing Sheets

HEADER POSITION CONTROL WITH DYNAMICALLY ADAPTED SENSITIVITY

FIELD OF THE DESCRIPTION

The present description relates to self-propelled harvesting machines. More specifically, the present description relates to controlling header position of a self-propelled harvesting machine with a dynamically adapted sensitivity level.

BACKGROUND

There are a wide variety of different types of agricultural machines. They include self-propelled harvesting machines, such as combines (also referred to as combine harvesters).

Combine harvesters are often fitted with a header which is vertically movable relative to the ground. For instance, one or more hydraulic actuators (or other actuators) are coupled between the header and the frame of the combine harvester so that they can raise and lower the header, as needed.

In some scenarios (such as, for example, when harvesting small grains) the combine harvester is operated so that the header closely follows the topology of the ground over which it is traveling. In order to do this, the operator often sets an initial height set point which establishes the height, above ground, at which the operator wishes the header to be maintained during operation. A closed loop system senses a variable indicative of header height, and controls the actuators that move the header vertically relative to the ground, in order to maintain the header height set point. A difference between the header height set point and the actual measured height is referred to as the header height error.

The closed loop control system also often receives an operator sensitivity input value. The sensitivity input value is a value input by the operator which indicates the sensitivity of the closed loop system (that is, the responsiveness with which it attempts to reduce the header height error). In some cases, the sensitivity value can be input by the operator using an operator input mechanism, such as a dial, a slider, an actuator on a touchscreen display, or other input mechanisms.

Some combine harvesters also have a relatively wide header. For instance, on some combine harvesters, some headers can be 40-50 feet wide, or even wider. In those cases, the header is often provided with an additional tilt (or roll) degree of freedom in which it can rotate (or parts of it can rotate) about a longitudinal, front-to-back axis of the combine. Thus, additional actuators (e.g., hydraulic cylinders) can be provided to control the tilt (or roll) position of the header (or the movable portions of the header).

The discussion above is merely provided for general background information and is not intended to be used as an aid in determining the scope of the claimed subject matter.

SUMMARY

The height of a header of a self-propelled harvesting machine is controlled by a closed loop header position control system. A sensitivity control system receives parameters related to header position error (e.g., an accuracy parameter) and machine stability (e.g., a stability parameter) and automatically identifies a sensitivity metric indicative of a sensitivity with which the header position control system controls the header height, based upon the received parameters. The sensitivity metric is provided to the header position control system. The header position control system performs closed loop header position control with a sensitivity level based upon the sensitivity metric provided by the sensitivity control system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
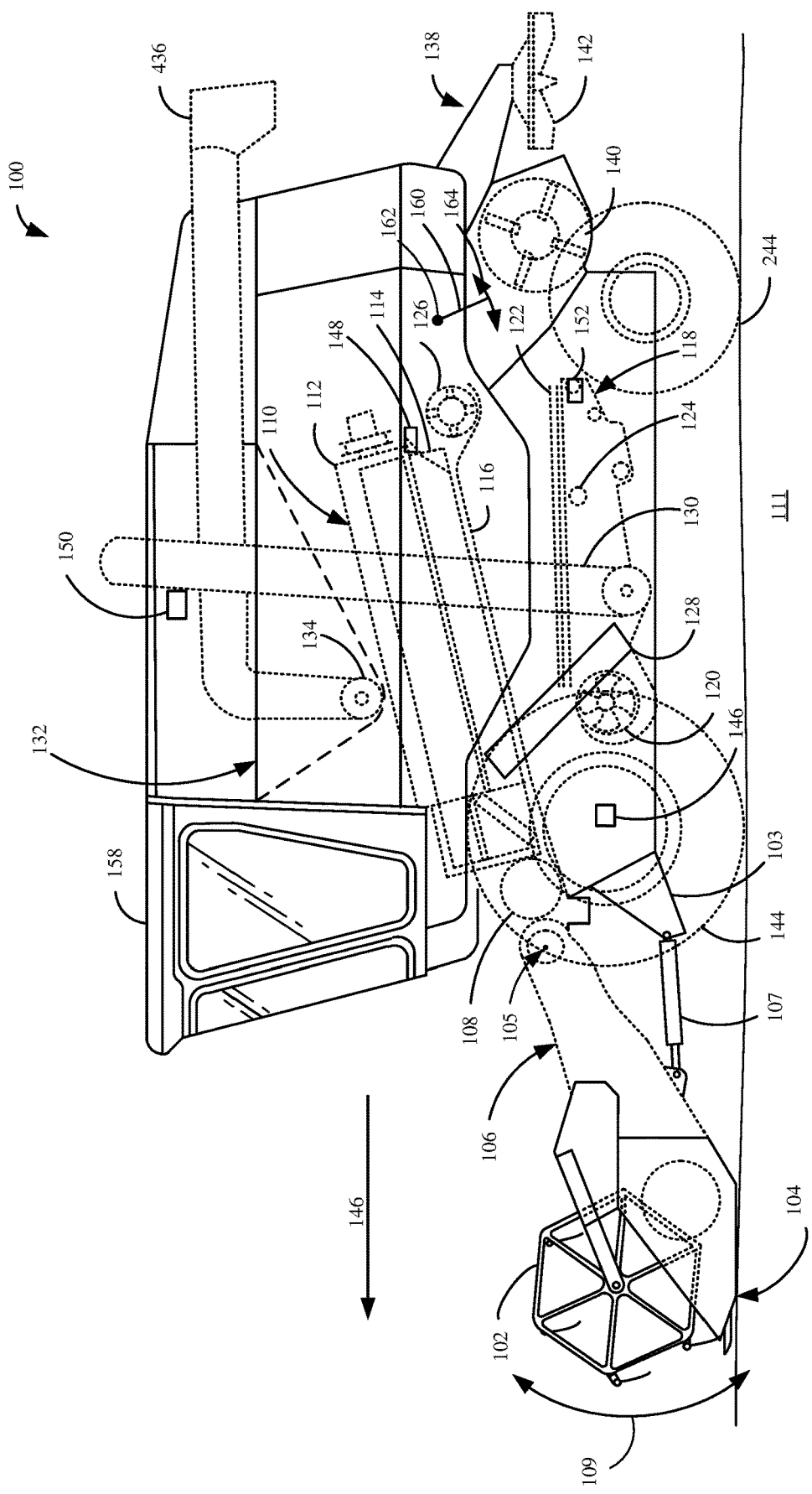
FIG. 1 is a partial pictorial, partial schematic view of a self-propelled harvesting machine (a combine harvester).

The present description relates to controlling the header height of a self-propelled harvesting machine, such as a combine harvester (or combine). As discussed in the background, some combine harvesters have a closed loop control system that controls header position based on a set point, which may be input by an operator, and the measured header position (such as the height of the header off the ground). The difference between the set point and the measured header position represents a header position error. In examples where the combine has a relatively wide header, in addition to the height adjustment there may also be mechanisms in place to adjust the roll (or tilt) angle of the header relative to the frame of the combine harvester. This can be used in order to maintain header position in areas of uneven terrain.

Problems can arise with such a closed loop system. For instance, when the sensitivity of the system is set relatively high, so that the closed loop control system reacts quickly to changes in the header position error, this can cause the control system to actuate header position actuators quickly. While the actuators may have limitations in how quickly they can respond, the control system can control the actuators quickly enough that the combine harvester exhibits characteristics of instability.

For instance, the header is often cantilevered off the front of the frame of the combine harvester. The combine harvester normally has tires, which can act as springs. The header is also relatively heavy so that when it is moved, it can excite resonant frequencies in the mechanical structure of the combine causing the combine to bounce or oscillate in the vertical direction. When this happens, the control system can attempt to control header height, in response to the bounces, which can exacerbate the frequency or magnitude of oscillation or bouncing movement of the harvesting machine. Not only does this result in an uneven or unstable ride for the operator, it also results in an uneven cut of the crop being harvested, which can cause the performance of the harvesting machine to suffer.

In one example, the physical stability of the combine can be characterized by the amount or magnitude (e.g., amplitude) of machine bouncing or oscillation induced by changing the header position. The machine is relatively stable if the bouncing or oscillation is short lived and damps off relatively quickly. The longer the bouncing or oscillation continues, the less stable the combine. In some cases, when the sensitivity is set high, the oscillation or damping increases, instead of reduces.

Problems can also result when the sensitivity of the closed loop header position control system is set to low. When this occurs, the system will be less responsive and, react more slowly, to header position errors. Thus, when the sensitivity is set too low, this can increase the header position error and also degrade the performance of the harvesting machine.

Some current systems have provided a user input mechanism which allows the operator to set the sensitivity level of the closed loop header position control system. This is cumbersome and can be inaccurate. For instance, on combine harvesters, there are a relatively large number of systems that the operator is already responsible for controlling. Adding sensitivity control to the header position control system thus exacerbates the load placed on the operator in controlling the machine. Similarly, in situations where the terrain is relatively uneven, this can result in the operator needing to change the sensitivity input relatively often, as the characteristics of the terrain or other harvesting or machine parameters change.

The present description thus relates to dynamically identifying a sensitivity level for the header position control system in order to improve the performance of the machine in performing a harvesting operation. Header position accuracy parameters are detected (such as header position error). Stability parameter(s), which are indicative of the physical stability of the machine, are also detected. A header position sensitivity level is identified, based upon the accuracy parameter(s) and stability parameter(s), and a sensitivity signal is generated based on the identified sensitivity level. The sensitivity signal is provided to a header position control system so that the header position control system performs closed loop control in controlling the header position actuators that drive movement of the header, to its various positions, with a sensitivity level indicated by the sensitivity signal.

FIG. 1 is a partial pictorial, partial schematic, illustration of a self-propelled agricultural harvesting machine 100, in an example where machine 100 is a combine harvester (or combine). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Header 102 is pivotally coupled to a frame 103 of combine 100 along pivot axis 105. One or more actuators 107 drive movement of header 102 about axis 105 in the direction generally indicated by arrow 109. Thus, the vertical position of header 102 above ground 111 over which it is traveling can be controlled by actuating actuator 107. While not shown in FIG. 1, it may be that the tilt (or roll) angle of header 102 or portions of header 102 can be controlled by a separate actuator. Tilt, or roll, refers to the orientation of header 102 about the front-to-back longitudinal axis of combine 100.

Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. The operator illustratively sets a height setting for header 102 (and possibly a tilt or roll angle setting) and a control system (described below) controls actuator 107 (and possibly a tilt or roll actuator—not shown) to maintain header 102 at the set height above ground 111 (and at the desired roll angle). The control system responds to header error (e.g., the difference between the set height and measured height of header 104 above ground 111 and possibly roll angle error) with a responsiveness that is determined based on a set sensitivity level. If the sensitivity level is set high, the control system responds to, smaller header position errors, and attempts to reduce them more quickly than if the sensitivity is set lower.

Header 104 is relatively heavy. Therefore, if the sensitivity is set too high, the control system will move header in the vertical direction (indicated by arrow 109) quickly in response to header position error. This can cause the combine 100 to being bouncing, as tires 144 act like springs. The control system then again responds to this bouncing motion by attempting to correct the header height error induced by the bouncing motion, quickly. This can cause more bouncing and can excite resonant frequencies in combine 100 which lead to instability (in that the bouncing can continue, be amplified, etc.). Thus, a dynamic sensitivity control system is described in greater detail below with respect to FIG. 2.

Returning to the description of the operation of combine 100, after the crop is cut by cutter 104, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a header height sensor that senses a height of header 102 above ground 111. They can include stability sensors that sense oscillation or bouncing motion (and amplitude) of combine 100. They can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
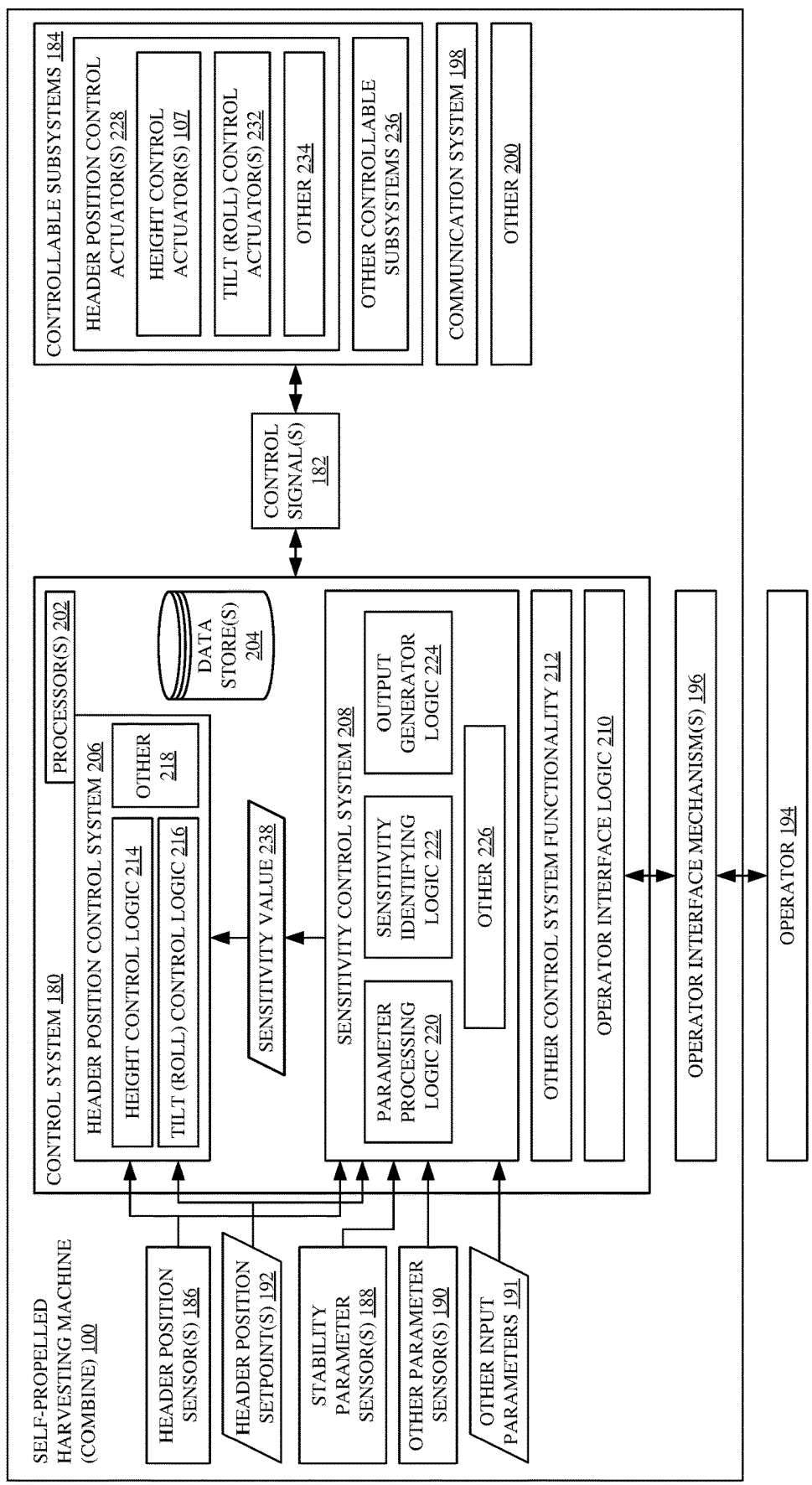
FIG. 2 is a block diagram showing some portions of the combine harvester illustrated in FIG. 1, in more detail.

FIG. 2 is a block diagram showing one example of self-propelled harvesting machine (combine) 100 in more detail. In the example shown in FIG. 2, combine 100 illustratively includes a control system 180 that generates control signals 182 that are provided to a set of controllable subsystems 184. Control system 180 is shown receiving a plurality of different sensor signals, such as a signal from header position sensor 186, stability parameter sensors 188 and other parameter sensors 190. Control system 180 also illustratively receives one or more header position set points 192 and it can include other parameter inputs 191. FIG. 2 also shows that an operator 194 can interact through operator interface mechanisms 196 with control system 180. Operator 194 can interact with mechanisms 196 in order to control and manipulate control system 180 and other portions of combine 100. In addition, FIG. 2 shows that combine 100 can include communication system 198 and other items 200.

Before describing the operation of combine 100 in automatically and dynamically setting a sensitivity level for controlling header position, a brief description of some items in combine 100, and their operation, will first be provided. Control system 180 illustratively includes one or more processors 202, data store 204, header position control system 206, sensitivity control system 208, operator interface logic 210, and it can include a wide variety of other control system functionality 212. Header position control system 206, itself, illustratively includes height control logic 214, tilt (or roll) control logic 216, and it can include other items 218. Sensitivity control system 208, itself, illustratively includes parameter processing logic 220, sensitivity identifying logic 222, output generator logic 224, and it can include other items 226.

Controllable subsystems 184 illustratively include header position control actuators 228 (which can include height control actuators 107, tilt (or roll) control actuators 232 and other position control actuators 234). Controllable subsystems 184 can include a wide variety of other controllable subsystems 236.

In operation, header position control system 206 illustratively receives the header position set points 192. The set points can be provided by operator 194 through an operator interface mechanism 196, or obtained in another way. Set points 192 can include a height set point indicative of a height at which header 102 is to be maintained above ground 111. It can also include a tilt set point indicative of a roll angle that header 102 is to maintain, relative to a longitudinal front-to-back axis of combine 100. Header position control system 106 can also include a signal from one or more header position sensors 186 which sense or measure the height of header 102 above ground 111, and can also measure the roll angle of header 102 about the longitudinal axis. Sensors 186 can take a wide variety of different of forms. For instance, they can be potentiometer or angle encoders that sense the rotation of header 102 about axis 105 or the angular position of header 102 relative to the frame of machine 100. Then, knowing the dimensions of header 102 and combine 100, the height of header 102 off of the ground 111 can be determined. Sensors 146 can be other sensors that measure other parameters from which the height of header 102 can be derived or calculated. They can also be sensors that sense the height of header 102 off the ground 111 directly, such as radar, lidar, ultrasonic, laser, mechanical or other sensors.

Sensitivity control system 208 receives signals indicative of the header position error (such as the difference between the set points and the measured position of header 102) or it can receive the signal from header position sensors 186 and the set points 192 and calculate the errors, itself. Sensitivity control system 208 also illustratively receives sensor signals from stability parameter sensors 188 which sense characteristics or variables indicative of the physical stability of combine 100. For instance, they can include one or more accelerometers that sense the acceleration (e.g., the bouncing or oscillation) of combine 100. The other sensors 190 can include some of the sensors described above with respect to FIG. 1, such as a position sensor, a ground speed sensor (or other machine travel speed sensors), among others. Input parameters 191 can include a wide variety of different parameters as well. For instance, they can include machine configuration parameters that indicate the make, model and configuration of combine 100. They can specify the types of tires 144, the weight of header 102 (or other header identifying information) among other things. In addition, parameters 191 can include terrain information, such as a topology map indicative of the topology of the terrain over which combine 100 is traveling. The input parameters can include a wide variety of other parameters as well. These parameters can be input by operator 194, they can be retrieved or downloaded from a remote system, they can be obtained from data store 204, or they can be obtained in other ways.

The height control logic 214 and tilt (or roll) control logic 216 illustratively identify the position error of header 102 relative to the set points 192 and generate control signals 182 to reduce those errors. They illustratively perform this type of closed loop control with a sensitivity indicated by a sensitivity value (or sensitivity signal) 238 that is generated by sensitivity control system 208. The sensitivity will determine the responsiveness of the control system.

In order to generate the sensitivity value 238, parameter processing logic 220 illustratively receives the various sensor signals and other parameter values and can perform processing on those signals and values. For instance, if a raw sensor signal needs to be conditioned and then a parameter is derived based upon the sensor signal value, then parameter processing logic 220 performs that type of processing. It illustratively obtains a set of accuracy parameters and stability parameters that are indicative of the header position error (discussed above) and the stability of combine 100, respectively. Those parameters can measure the accuracy and stability directly, or they can be parameters that are indicative of those values. For instance, if the parameters identify topology, machine speed, the configuration of combine 100 and the types of tires that it has, then estimates indicative of machine stability can be generated using those parameters. The sensors can be accelerometers that sense bouncing motion. They can sense changes in position of header 102 or other parts of combine 100 relative to the ground to identify bouncing. These are examples only.

The parameters are provided to sensitivity identifying logic 222 which includes logic for identifying the sensitivity level 238 based upon the parameters it has received. Logic 222 can run an algorithm which may have previously been downloaded to combine 100, or stored on combine 100 in data store 204. It can implement a look up table which receives the collection of parameter values and identifies a sensitivity level 238 in a look up table, indexed by those parameter values. It can dynamically change the algorithm it uses to identify sensitivity level 238, based upon the parameter values. For instance, if it identifies a first sensitivity level 238 based on a set of parameter values, but the stability parameters tend to indicate increased instability, then this can be fed back to modify the algorithm so that it selects a lower sensitivity value, given those parameters. This is an example only.

Output generator logic 224 generates an output signal indicative of the sensitivity level identified by sensitivity identifying logic 222 and provides that signal, as sensitivity value 238, to header position control system 206. Header position control system 206 then performs closed loop control of the actuators that are used to determine header position, based on the position error and sensitivity value 238. The control signals 182 are provided to height control actuators 107 and tilt (or roll) control actuators 232. The control signals illustratively control the height and tilt (or roll) of header 102 to perform ground following in an attempt to maintain it at a height and tilt (roll) angle defined by set points 192, while maintaining machine stability.

Communication system 198 illustratively enables items in combine 100 to communicate with one another and enables items in combine 100 to communicate with remote systems (some of which are described in more detail below with respect to FIG. 4). Thus, communication system 198 can include a controller area network (CAN) bus, and communication mechanisms that allow it to communicate over various networks, such as a wide area network, a local area network, a near field communication network, a cellular communication network, or a wide variety of other networks or combinations of networks. It can also be used to communicate using store-and-forward communication which is described in greater detail below as well.

Operator interface logic 210 illustratively detects operator inputs through operator interface mechanisms 196 and generates outputs for those mechanisms as well. It can provide an indication of the operator interactions to other items in combine 100.

Operator interface mechanisms 196 can include a wide variety of mechanisms, such as a steering wheel, levers, joysticks, pedals, buttons, knobs, linkages, etc. It can also include haptic feedback mechanisms, optical and audio mechanisms as well. Also, information may be displayed to operator 194 on a user interface display screen. The display screen can have actuators that user 194 can actuate. Those actuators can include, for instance, links, icons, buttons, etc. Further, where the display is generated on a touch sensitive display or in a system where speech recognition is provided, operator 194 can actuate those actuators using touch gestures or speech commands as well.

Figure 3:
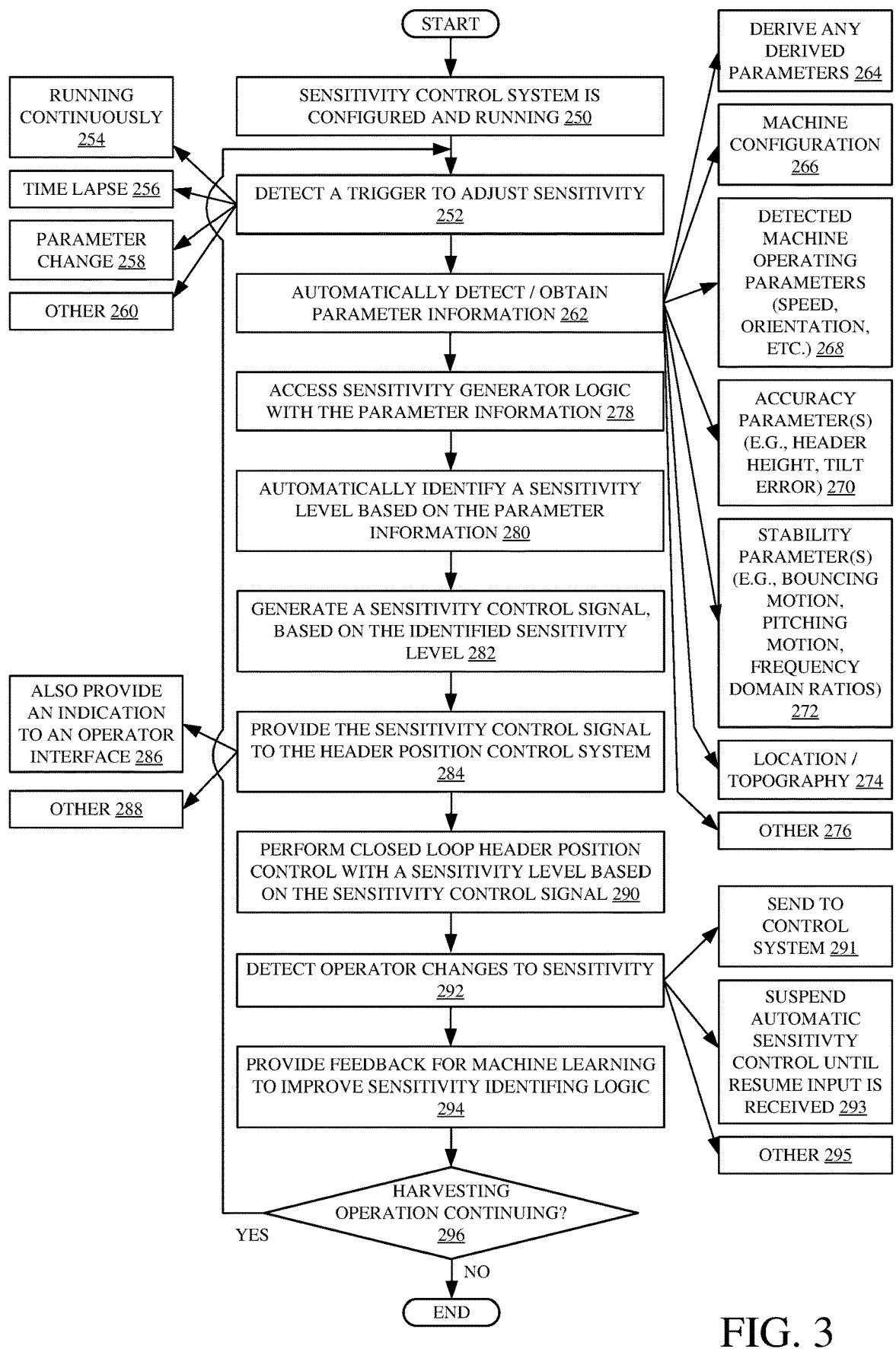
FIG. 3 is a flow diagram illustrating one example of the operation of the combine harvester, illustrated in FIGS. 1 and 2, in automatically identifying a sensitivity level for a header position control system that controls the position of a header on the combine harvester.

FIG. 3 shows a flow diagram illustrating one example of the operation of combine 100 in identifying a sensitivity value 238 and providing it to header position control system 206 where closed loop header position control is performed. It is first assumed that combine 100 has sensitivity control system 208 configured and running so that it can generate sensitivity values 238 for header position control system 206. This is indicated by block 250 in the flow diagram of FIG. 3. The algorithm or logic run by sensitivity identifying logic 222 can be generated in a wide variety of different ways. In one example, the algorithm is generated using a machine learning component that performs supervised learning classification. It receives training data with labeled inputs and desired outputs and learns the general rule that maps the inputs to the outputs in an optimized fashion. Machine learning can be performed using a wide variety of different learning mechanisms, such as neural networks, deep neural networks, decision trees, other classification or learning mechanisms, etc. In one example, the training data is a set of data that identifies an optimum sensitivity setting for various machine configurations and field conditions. The machine learning mechanism illustratively minimizes a loss function (or objection function) on the set of training data and generates and algorithm or model that performs accurately on new inputs. In one example, the goal of the objective function for adaptive header height sensitivity control is accuracy, meaning that the header height error is to be minimized. One measure of header height accuracy may be, for instance, the standard deviation of header height error (or header position error where tilt is considered as well). Root-mean-squared (RMS) height error is another measure of header height accuracy.

One constraint on the accuracy objective, as discussed above, is that the system is to remain stable. Operators normally have a relatively low tolerance for system oscillations, waviness of cut during the harvesting operation, machine pitch and vertical bounce motion. Another constraint on the objective function is on the motion, or energy, used by the header position control system. For instance, there is normally a maximum flow rate and acceleration with which the header 102 can be moved. However, those mechanical limits may not perform well as constraints on the motion or energy used by the header position control system 206. This is because if the header 102 is moved at the maximum rate defined by the maximum flow rate and acceleration, this may induce jerkiness and vehicle pitch and bounce motion that accompanies this type of quick response.

Other variables that can be considered in the objective function include (in addition to the height sensor data and height error data, as well as the tilt error), vehicle speed, lift cylinder pressure, feeder house position, pressure feedback system gain, and machine pitch and vertical bounce measurement, as discussed above. All of these can be sensed by sensors, or variables indicative of those parameters can be sensed, and the parameters, themselves, can be derived.

In addition, a frequency domain analysis can be used to identify additional parameters. For instance, the effect of sensitivity on header motion and machine dynamics can be more clearly characterized in the frequency domain. When this is undertaken on test data, it has been identified that there is more energy at the higher frequencies (above 0.5 hertz) where the sensitivity level is set to its maximum value, and there is more energy at the lower frequencies (below 0.2 hertz) where the sensitivity value is set to its lowest level. Thus, the ratio of the maximum frequency amplitude in the high frequency range to the maximum frequency amplitude in the low frequency range may be a good normalized constraint for the adaptive sensitivity algorithm.

In one example, the adaptive sensitivity algorithm is obtained by setting the default position sensitivity to 50 percent of its maximum value. If the ratio of the Fast Fourier transform amplitudes discussed above is below 0.6, then the sensitivity level is increased, subject to the restraints on header width and valve command. If the ratio of the Fast Fourier transform amplitude is above 0.7, then the sensitivity level is decreased, subject to those same constraints. If the header error standard deviation is lower at the new sensitivity setting, then the algorithm stays at that setting and repeats the process. Otherwise, it reverts back to the previous sensitivity setting. The algorithm can be trained in this way, and a supervised learning approach can be performed, on a training set of data which is obtained by having operators manually set an optimum sensitivity level over varying terrain conditions, using various machine configurations.

Returning to block 250 in the flow diagram of FIG. 3, however the sensitivity identifying algorithm (or logic) 222 is obtained, it is assumed that is ready for processing on combine 100.

Sensitivity control system 208 then detects a trigger indicating that it is to evaluate the sensitivity value 238 for possible adjustment. This is indicated by block 252. In one example, sensitivity control system 208 is continuously running sensitivity identifying logic 222 in order to maintain a current sensitivity value 238, given the currently received parameters. Running continuously is indicated by block 254 in the flow diagram of FIG. 3. Sensitivity control system 208 may also be configured to run intermittently, or periodically. In that case, a time lapse 256 may be a trigger that is used to identify a new sensitivity value 238. In another example, when one of the parameters changes by a threshold amount, this may indicate that a new sensitivity value 238 is to be identified. This is indicated by block 258. The sensitivity control system 208 can detect a trigger indicating that it is to evaluate the sensitivity value 238 in a wide variety of other ways as well, and this is indicated by block 260.

In order to evaluate the efficacy of sensitivity value 238, and determine whether it should be changed, parameter processing logic 220 first automatically detects or obtains all of the parameter information from the various sensors and parameter inputs discussed above. This is indicated by block 262 in the flow diagram of FIG. 3. For instance, it can receive variables and derive parameter values from those received variables. This is indicated by block 264. It can receive machine configuration input information from operator 194, retrieve it from data store 204, or in other ways. This is indicated by block 266. It can detect machine operating parameters (such as ground speed, machine orientation, tire type, header width, etc.). This is indicated by block 268. It can also detect the header position accuracy (or error) values based on the header position set points 192 and the measured header position from sensors 186. This is indicated by block 270. It can receive the stability parameters from stability parameter sensors 188. This is indicated by block 272. It can receive a wide variety of other information, such as machine location and topography information 274, or other information 276.

Sensitivity identifying logic 222 then accesses a sensitivity generator (such as logic or an algorithm) with the parameters received and/or generated by parameter processing logic 220. It runs that logic to generate or identify a sensitivity level that header position control system 206 should use in controlling header position. By way of example, if the sensitivity generator is a look up table, indexed by parameters, then logic 222 looks up the sensitivity level. If it is a dynamic model, logic 222 applies the model to the parameters to obtain the sensitivity level. If it is another type of dynamic algorithm, logic 222 runs that algorithm using the parameters to obtain the sensitivity level. Accessing the sensitivity generator and running it to generate a sensitivity level based on the parameters is indicated by blocks 278 and 280, respectively.

Output generator logic 224 then generates a sensitivity control signal (e.g., sensitivity value 238) based upon the identified sensitivity level. This is indicated by block 282. It provides the sensitivity control signal to the header position control system as sensitivity value 238. This is indicated by block 284. In one example, output generator logic 224 also controls operator interface logic 210 in order to provide an indication of the sensitivity value 238 to operator 194. This is indicated by block 286. It can be provided to a user interface display to display the sensitivity value, or it can be provided in other ways as well. This is indicated by block 288.

Header position control system 206 then performs closed loop header position control with a sensitivity level based on the sensitivity control signal (or sensitivity value) 238 that was just provided from sensitivity control system 208. Performing the closed loop control with the sensitivity value is indicated by block 290 in the flow diagram of FIG. 3.

It may be that, during operation of combine 100, the operator may wish to override the dynamically generated sensitivity value 238. For instance, it may be that the sensitivity value is causing an undesirably large machine oscillation or instability characteristics (because it is set too high), or an undesirably large header position error (because it is set too low). In that case, the operator may provide an input to change the sensitivity value 238 through a suitable operator interface mechanism 196. The operator interface mechanism may be a dial, an actuatable element on a user interface display, etc. Detecting operator changes to the sensitivity value is indicated by block 292 in the flow diagram of FIG. 3. The changes are automatically provided to header position control system 206, and an indication that the operator has overridden sensitivity control system 208 is provided to system 208. This is indicated by block 291. By automatically it is meant that the step or function is performed without further manual involvement except, perhaps, to initiate or authorize it. System 208 then suspends its operation until the operator provides another input indicating that it should restart its operation. This is indicated by block 293. Operator changes can be detected and processed in other ways as well. This is indicated by block 295.

In addition, the detected operator change to the sensitivity level can be provided as feedback for the machine learning system that generated the sensitivity generator that is run by sensitivity identifying logic 222, so that it can be made more accurate. Providing the feedback for machine learning is indicated by block 294 in the flow diagram of FIG. 3. This feedback can be provided in near real time, as operator 194 makes the changes, or it can be stored and provided at a later time. It can also be provided to sensitivity control system 208, which uses it to modify its own sensitivity generator (e.g., the look up table, the model, or dynamic algorithm) to accommodate for (or reflect) the operator changes.

The operation of control system 180 continues, in this way, until the harvesting operation is completed. This is indicated by block 296 in the flow diagram of FIG. 3. The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGS. show a number of blocks with functionality ascribed to each block. It will be noted that fewer blocks can be used so the functionality is performed by fewer components. Also, more blocks can be used with the functionality distributed among more components.

Figure 4:
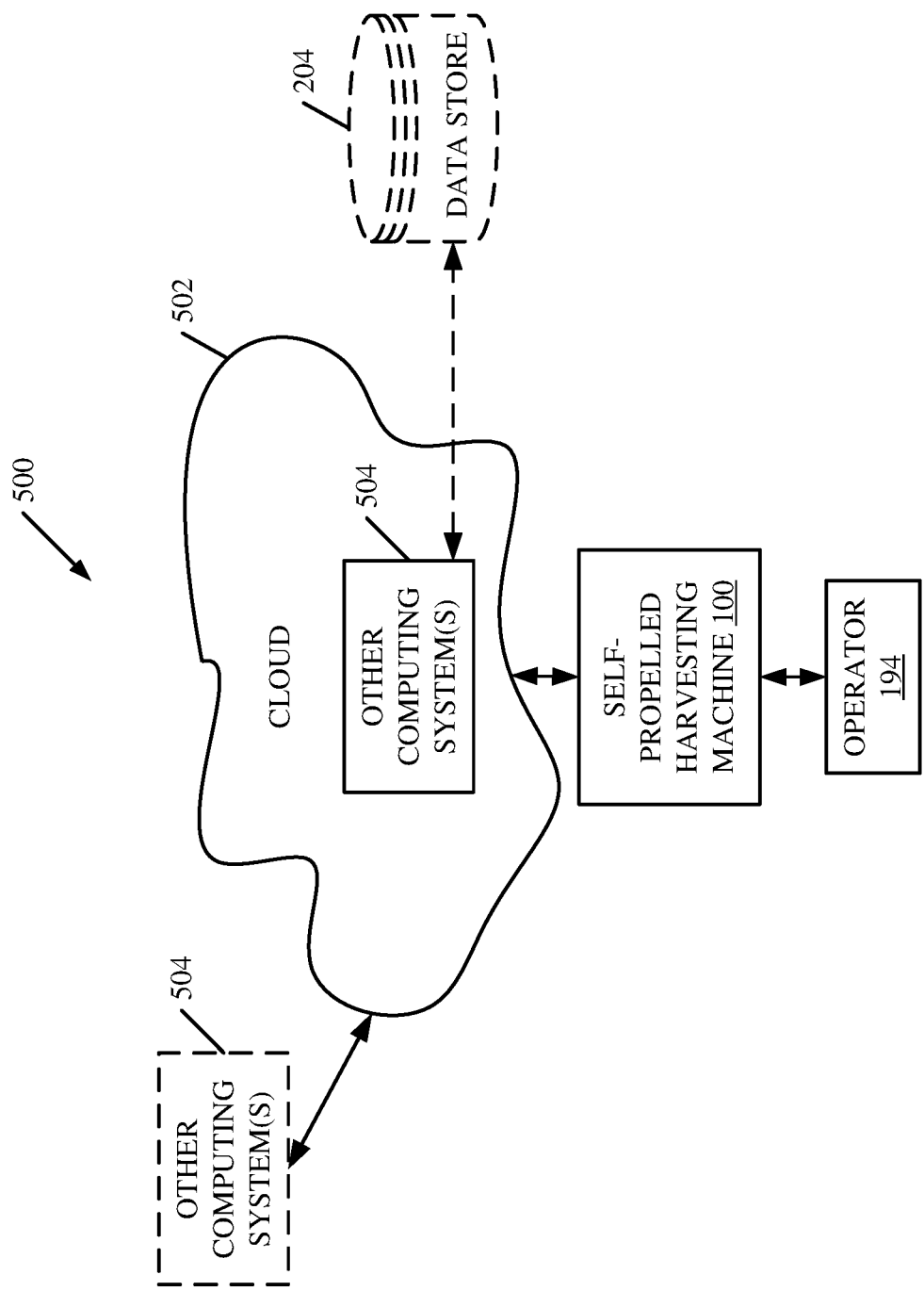
FIG. 4 is a block diagram showing one example of the self-propelled harvesting machine architecture illustrated in FIG. 1, deployed in a remote server environment.

FIG. 4 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 4, some items are similar to those shown in FIG. 2 and they are similarly numbered. FIG. 4 specifically shows that machine 100 can communicate with other computing systems 504 located at a remote server location 502. Therefore, harvester 100 accesses those systems through remote server location 502. For example, the algorithm, model or other dynamic component used by logic 222 to identify the sensitivity level can be accessed in system(s) 504, or downloaded from them or otherwise.

FIG. 4 also depicts another example of a remote server architecture. FIG. 4 shows that it is also contemplated that some elements of FIG. 2 are disposed at remote server location 502 while others are not. By way of example, other computing systems 504 and data store 204 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
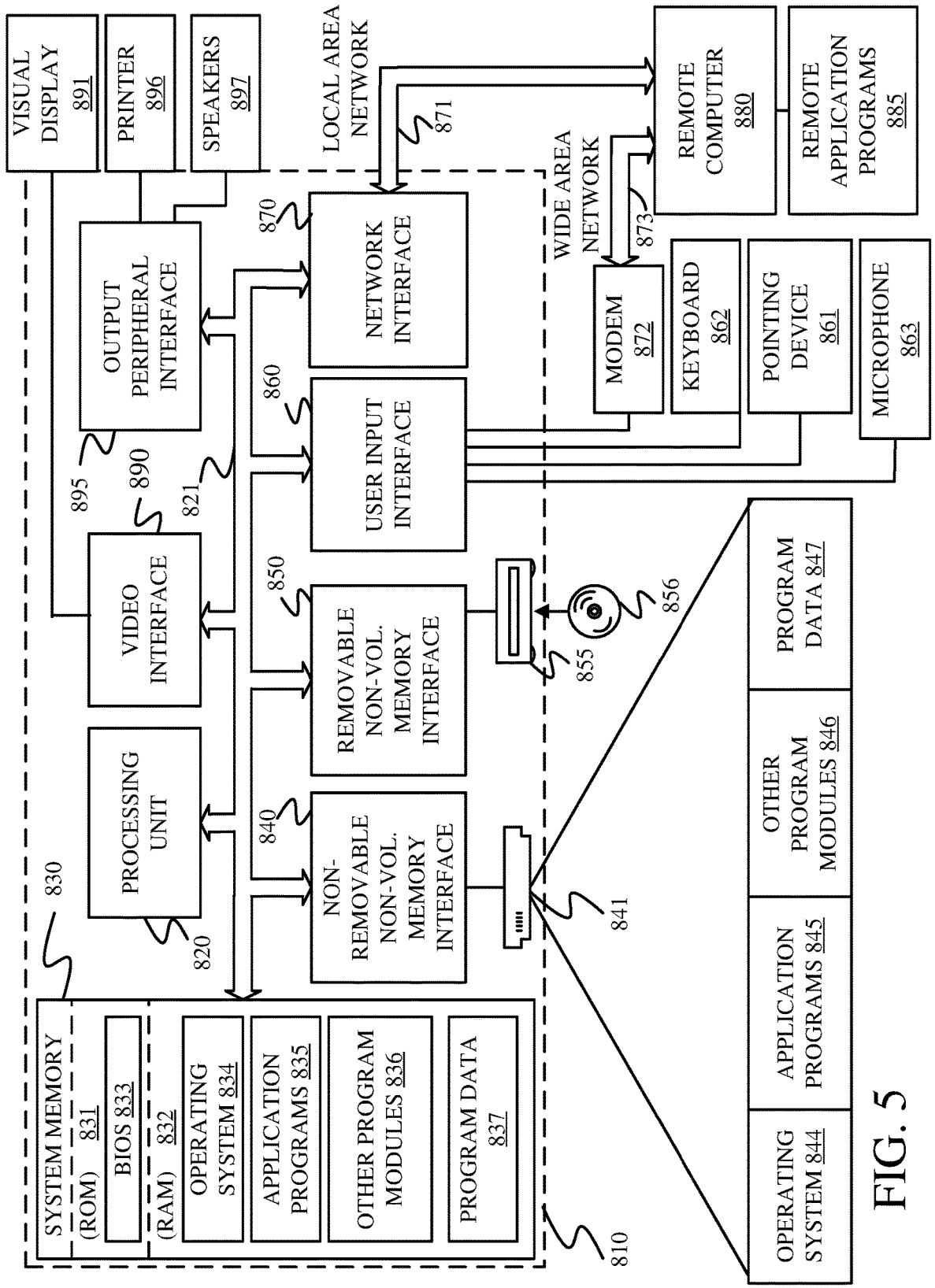
FIG. 5 is a block diagram showing one example of a computing environment that can be used in the architecture shown in the previous FIGS.

FIG. 5 is one example of a computing environment in which elements of FIG. 2, or parts of them, (for example) can be deployed. With reference to FIG. 5, an example system for implementing some embodiments includes a general-purpose computing device in the form of a computer 810. Other examples can include mobile devices. Components of computer 810 may include, but are not limited to, a processing unit 820 (which can comprise processor 202), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a control system for controlling an agricultural harvesting machine, comprising:

a header position sensor that senses a position variable indicative of a position of a header on the agricultural harvesting machine relative to a surface over which it travels and generates a sensed position signal indicative of the sensed position variable;

a header position control system that receives a position setpoint value indicative of a commanded header position and the sensed position signal and performs closed loop control of a header position actuator, that moves the header to different positions relative to the surface, based on a header position error indicated by the position setpoint value and the sensed position variable;

a stability parameter sensor that senses a stability parameter indicative of a physical stability of the agricultural harvesting machine and generates a stability parameter signal indicative of the sensed stability parameter; and a sensitivity control system that automatically obtains the header position error and the stability parameter signal and automatically identifies a sensitivity value that sets a sensitivity of the header position control system in responding to the header position error and provides a sensitivity signal, indicative of the sensitivity value, to the header position control system, the header position control system performing the closed loop control of the header position actuator with the sensitivity value indicated by the sensitivity signal.

Example 2 is the control system of any or all previous examples wherein the stability parameter sensor comprises:

a header motion sensor configured to sense motion of the header that is indicative of the physical stability of the agricultural harvesting machine.

Example 3 is the control system of any or all previous examples wherein the sensitivity control system comprises:

parameter processing logic configured to generate, based on the stability parameter signal, a frequency domain representation of the sensed motion of the header.

Example 4 is the control system of any or all previous examples wherein the sensitivity control system comprises:

sensitivity identifying logic configured to identify the sensitivity value based on the frequency domain representation of the sensed motion of the header and the header position error.

Example 5 is the control system of any or all previous examples wherein the parameter processing logic is configured to generate the frequency domain representation of the sensed motion of the header as a ratio of a maximum frequency domain amplitude in a high frequency range and a maximum frequency domain amplitude in a low frequency range that is lower than the high frequency range.

Example 6 is the control system of any or all previous examples wherein the header position sensor senses, as the position variable, a height variable indicative of a header height relative to the surface over which it is traveling.

Example 7 is the control system of any or all previous examples wherein the header position actuator comprises a header height actuator that is actuated to control the header height relative to the surface and wherein the header position control system comprises:

height control logic configured to perform closed loop header height control to control the header height actuator with the sensitivity value indicated by the sensitivity signal.

Example 8 is the control system of any or all previous examples wherein the header position sensor senses, as the position variable, a tilt variable indicative of a header roll angle relative to a longitudinal axis of the agricultural machine.

Example 9 is the control system of any or all previous examples wherein the header position actuator comprises a header tilt actuator that is actuated to control the header roll angle and wherein the header position control system comprises:

tilt control logic configured to perform closed loop header tilt control to control the header tilt actuator with the sensitivity value indicated by the sensitivity signal.

Example 10 is the control system of any or all previous examples wherein the header motion sensor comprises:

a movement sensor configured to identify bouncing movement of the agricultural harvesting machine and to generate the stability parameter based on the identified bouncing movement.

Example 11 is a method of controlling an agricultural harvesting machine, comprising:

sensing a position variable indicative of a position of a header on the agricultural harvesting machine relative to a surface over which it travels;

generating a sensed position signal indicative of the sensed position variable;

detecting a position setpoint value indicative of a commanded header position;

performing, with a header position control system, closed loop control of a header position actuator, that moves the header to different positions relative to the surface, based on a header position error indicated by the position setpoint value and the sensed position variable;

sensing a stability parameter indicative of a physical stability of the agricultural harvesting machine;

generating a stability parameter signal indicative of the sensed stability parameter;

automatically identifying a sensitivity value that sets a sensitivity of the closed loop control by header position control system in responding to the header position error; and providing a sensitivity signal, indicative of the sensitivity value, to the header position control system, the header position control system performing the closed loop control of the header position actuator with the sensitivity value indicated by the sensitivity signal.

Example 12 is the method of any or all previous examples wherein sensing a stability parameter comprises:

sensing motion of the header that is indicative of the physical stability of the agricultural harvesting machine.

Example 13 is the method of any or all previous examples wherein identifying a sensitivity value comprises:

generating, based on the stability parameter signal, a frequency domain representation of the sensed motion of the header; and identifying the sensitivity value based on the frequency domain representation of the sensed motion of the header and the header position error.

Example 14 is the method of any or all previous examples wherein generating a frequency domain representation comprises:

generating the frequency domain representation of the sensed motion of the header as a ratio of a maximum frequency domain amplitude in a high frequency range and a maximum frequency domain amplitude in a low frequency range that is lower than the high frequency range.

Example 15 is the method of any or all previous examples wherein the header position actuator comprises a header height actuator that is actuated to control the header height relative to the surface and wherein sensing a position variable comprises:

sensing a height variable indicative of a header height relative to the surface over which it is traveling, wherein performing closed loop control comprises performing closed loop header height control to control the header height actuator with the sensitivity value indicated by the sensitivity signal.

Example 16 is the method of any or all previous examples wherein the header position actuator comprises a header tilt actuator that is actuated to control the header roll angle and wherein sensing a position variable comprises:

sensing a tilt variable indicative of a header roll angle relative to a longitudinal axis of the agricultural machine, wherein performing closed loop control comprises performing closed loop header tilt control to control the header tilt actuator with the sensitivity value indicated by the sensitivity signal.

Example 17 is the method of any or all previous examples wherein sensing motion of the header comprises:

sensing bouncing movement of the agricultural harvesting machine.

Example 18 is a self-propelled agricultural harvesting machine, comprising:

a power source;

a frame;

a set of ground engaging elements driven by the power source to propel the agricultural harvesting machine over a surface;

a header, movably coupled to the frame, that engages crop and cuts harvested material for processing by the agricultural harvesting machine;

a header position actuator coupled to the header to drive movement of the header to different positions relative to the surface over which the agricultural harvesting machine travels;

a header position sensor that senses a position variable indicative of a position of the header relative to the surface and generates a sensed position signal indicative of the sensed position variable;

a header position control system that receives a position setpoint value indicative of a commanded header position and the sensed position signal and performs closed loop control of the header position actuator based on a header position error indicated by the position setpoint value and the sensed position variable;

a stability parameter sensor that senses a stability parameter indicative of a physical stability of the agricultural harvesting machine and generates a stability parameter signal indicative of the sensed stability parameter; and a sensitivity control system that automatically obtains the header position error and the stability parameter signal and identifies a sensitivity value that sets a sensitivity of the header position control system in responding to the header position error and provides a sensitivity signal, indicative of the sensitivity value, to the header position control system, the header position control system performing the closed loop control of the header position actuator with the sensitivity value indicated by the sensitivity signal.

Example 19 is the self-propelled agricultural harvesting machine of claim 18 wherein the header position sensor comprises:

a movement sensor configured to detect bouncing movement of the agricultural harvesting machine and to generate the stability parameter based on the detected bouncing movement.

Example 20 is the self-propelled agricultural harvesting machine of any or all previous examples wherein the header position sensor senses, as the position variable, a height variable indicative of a header height relative to the surface over which it is traveling, wherein the header position actuator comprises a header height actuator that is actuated to control the header height relative to the surface and wherein the header position control system comprises:

height control logic configured to perform closed loop header height control to control the header height actuator with the sensitivity value indicated by the sensitivity signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for controlling an agricultural harvesting machine, comprising:

a header position sensor that senses a position variable indicative of a position of a header on the agricultural harvesting machine relative to a surface over which the agricultural harvesting machine travels and generates a sensed position signal indicative of the sensed position variable;

a header position control system that receives a position setpoint value indicative of a commanded header position and the sensed position signal and performs closed loop control of a header position actuator, that moves the header to different positions relative to the surface, based on a header position error indicated by the position setpoint value and the sensed position variable;

a stability parameter sensor that senses a stability parameter indicative of a physical stability of the agricultural harvesting machine and generates a stability parameter signal indicative of the sensed stability parameter; and a sensitivity control system that automatically identifies a sensitivity value that sets a sensitivity of the header position control system in responding to the header position error, based on the header position error and the stability parameter signal, and provides a sensitivity signal, indicative of the sensitivity value, to the header position control system, the header position control system performing the closed loop control of the header position actuator with the sensitivity value indicated by the sensitivity signal.

2. The control system of claim 1, wherein the stability parameter sensor comprises:

a header motion sensor configured to sense motion of the header that is indicative of the physical stability of the agricultural harvesting machine.

3. The control system of claim 2, wherein the sensitivity control system comprises:

parameter processing logic configured to generate, based on the stability parameter signal, a frequency domain representation of the sensed motion of the header.

4. The control system of claim 3, wherein the sensitivity control system comprises:

sensitivity identifying logic configured to identify the sensitivity value based on the frequency domain representation of the sensed motion of the header and the header position error.

5. The control system of claim 4, wherein the parameter processing logic is configured to generate the frequency domain representation of the sensed motion of the header as a ratio of a maximum frequency domain amplitude in a high frequency range and a maximum frequency domain amplitude in a low frequency range that is lower than the high frequency range.

6. The control system of claim 1, wherein the header position sensor senses, as the position variable, a height variable indicative of a header height relative to the surface over which the agricultural harvesting machine is traveling.

7. The control system of claim 6, wherein the header position actuator comprises a header height actuator that is actuated to control the header height relative to the surface and wherein the header position control system comprises:
height control logic configured to perform closed loop header height control to control the header height actuator with the sensitivity value indicated by the sensitivity signal.

8. The control system of claim 1, wherein the header position sensor senses, as the position variable, a tilt variable indicative of a header roll angle relative to a longitudinal axis of the agricultural machine.

9. The control system of claim 8, wherein the header position actuator comprises a header tilt actuator that is actuated to control the header roll angle, and wherein the header position control system comprises:
tilt control logic configured to perform closed loop header tilt control to control the header tilt actuator with the sensitivity value indicated by the sensitivity signal.

10. The control system of claim 2, wherein the header motion sensor comprises:
a movement sensor configured to identify bouncing movement of the agricultural harvesting machine and to generate the stability parameter based on the identified bouncing movement.

11. A method of controlling an agricultural harvesting machine, comprising:
sensing a position variable indicative of a position of a header on the agricultural harvesting machine relative to a surface over which the agricultural harvesting machine travels;
generating a sensed position signal indicative of the sensed position variable;
detecting a position setpoint value indicative of a commanded header position;
performing, with a header position control system, closed loop control of a header position actuator, that moves the header to different positions relative to the surface, based on a header position error indicated by the position setpoint value and the sensed position variable;
sensing a stability parameter indicative of a physical stability of the agricultural harvesting machine;
generating a stability parameter signal indicative of the sensed stability parameter;
automatically identifying a sensitivity value that sets a sensitivity of the closed loop control by header position control system in responding to the header position error, based on the stability parameter signal and the header position error; and
providing a sensitivity signal, indicative of the sensitivity value, to the header position control system, the header position control system performing the closed loop control of the header position actuator with the sensitivity value indicated by the sensitivity signal.

12. The method of claim 11, wherein sensing a stability parameter comprises:
sensing motion of the header that is indicative of the physical stability of the agricultural harvesting machine.

13. The method of claim 12, wherein identifying a sensitivity value comprises:
generating, based on the stability parameter signal, a frequency domain representation of the sensed motion of the header; and
identifying the sensitivity value based on the frequency domain representation of the sensed motion of the header and the header position error.

14. The method of claim 13, wherein generating a frequency domain representation comprises:
generating the frequency domain representation of the sensed motion of the header as a ratio of a maximum frequency domain amplitude in a high frequency range and a maximum frequency domain amplitude in a low frequency range that is lower than the high frequency range.

15. The method of claim 11, wherein the header position actuator comprises a header height actuator that is actuated to control the header height relative to the surface and wherein sensing a position variable comprises:
sensing a height variable indicative of a header height relative to the surface over which the agricultural machine is traveling, wherein performing closed loop control comprises performing closed loop header height control to control the header height actuator with the sensitivity value indicated by the sensitivity signal.

16. The method of claim 11, wherein the header position actuator comprises a header tilt actuator that is actuated to control the header roll angle and wherein sensing a position variable comprises:
sensing a tilt variable indicative of a header roll angle relative to a longitudinal axis of the agricultural machine, wherein performing closed loop control comprises performing closed loop header tilt control to control the header tilt actuator with the sensitivity value indicated by the sensitivity signal.

17. The method of claim 12, wherein sensing motion of the header comprises:
sensing bouncing movement of the agricultural harvesting machine.

18. A self-propelled agricultural harvesting machine, comprising:
a power source;
a frame;
a set of ground engaging elements driven by the power source to propel the agricultural harvesting machine over a surface;
a header, movably coupled to the frame, that engages crop and cuts harvested material for processing by the agricultural harvesting machine;
a header position actuator coupled to the header to drive movement of the header to different positions relative to the surface over which the agricultural harvesting machine travels;
a header position sensor that senses a position variable indicative of a position of the header relative to the surface and generates a sensed position signal indicative of the sensed position variable;

a header position control system that receives a position setpoint value indicative of a commanded header position and the sensed position signal and performs closed loop control of the header position actuator based on a header position error indicated by the position setpoint value and the sensed position variable;

a stability parameter sensor that senses a stability parameter indicative of a physical stability of the agricultural harvesting machine and generates a stability parameter signal indicative of the sensed stability parameter; and a sensitivity control system that automatically obtains the header position error and the stability parameter signal and adjusts a sensitivity value that sets a sensitivity of the header position control system in responding to the header position error, based on the header position error and the stability parameter signal, and provides a sensitivity signal, indicative of the adjusted sensitivity value, to the header position control system, the header position control system performing the closed loop control of the header position actuator with the adjusted sensitivity value indicated by the sensitivity signal.

19. The self-propelled agricultural harvesting machine of claim 18, wherein the header position sensor comprises:

a movement sensor configured to detect bouncing movement of the agricultural harvesting machine and to generate the stability parameter based on the detected bouncing movement.

20. The self-propelled agricultural harvesting machine of claim 19, wherein the header position sensor senses, as the position variable, a height variable indicative of a header height relative to the surface over which the agricultural harvesting machine is traveling, wherein the header position actuator comprises a header height actuator that is actuated to control the header height relative to the surface and wherein the header position control system comprises:

height control logic configured to perform closed loop header height control to control the header height actuator with the sensitivity value indicated by the sensitivity signal.

\* \* \* \* \*